United States Patent Office 3,290,215
Patented Dec. 6, 1966

3,290,215
USE OF METHANOINDANAMINES AS ANTIVIRAL AGENTS
George Levitt, Wilmington, Del., assignor to E. I. du Pont de Nemours and Company, Wilmington, Del., a corporation of Delaware
No Drawing. Filed Oct. 7, 1964, Ser. No. 402,326
10 Claims. (Cl. 167—65)

This application is a continuation-in-part of my co-pending application Serial No. 319,660, filed October 29, 1963, now abandoned.

This invention relates to the use of a class of hexahydromethanoindanamines as pharmacological agents.

The disclosure herein should not be taken as a recommendation to use the disclosed invention in any way without full compliance with U.S. food and drug laws and other laws and governmental regulations which may be applicable.

According to the present invention, it has been found that a class of methanoindanamines are useful for pharmacological purposes, particularly as antiviral agents.

The compounds within the scope of the present invention are hexahydro-4,7-methanoindanamines and hexahydro-4,7-methanoindanmethylamines represented by the formula:

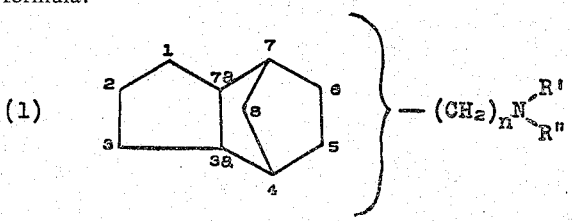

where

R' is hydrogen, alkyl of 1 through 4 carbon atoms, alkenyl of 3 through 4 carbon atoms having unsaturated bonding in other than the 1-position of said alkenyl group, or alkynyl of 3 through 4 carbon atoms having unsaturated bonding in other than the 1-position of said alkynyl group;

R" is R' or formyl; and
$n$ is 0 or 1.

In the above formula, the amino or aminomethyl substituent may be attached at any number position on the hexahydro-4,7-methanoindan moiety and it is noted that positions 3a and 7a are equivalent as are positions 5 and 6 and also 1 and 3.

The compounds within the scope of this invention have a basic amino group and form salts with acids. Although the amino compounds themselves are useful, salts with nontoxic acids are particularly desired for the pharmacological application of the present invention. Such salts include the hydrochloride, sulfate, phosphate, bicarbonate, acetate, lactate, succinate, propionate, tartrate, pamoate, acetylsalicylate, cyclohexylsulfamate, and citrate. These salts are readily prepared in organic solution, for example addition of acetic acid to an alcohol solution of 3a,4,5,6,7,7a-hexahydro-4,7-methanoindan-5-amine gives the acetate which is readily isolated by concentration of the solution under vacuum at moderate temperatures.

Particularly preferred compounds for purposes of the invention are the following compounds and their hydrochloride salts:

3a,4,5,6,7,7a-hexahydro-4,7-methanoindan-5-amine
3a,4,5,6,7,7a-hexahydro-4,7-methanoindan-2-amine
3a,4,5,6,7,7a-hexahydro-4,7-methanoindan-1-amine
3a,4,5,6,7,7a-hexahydro-N-methyl-4,7-methanoindan-5-amine
3a,4,5,6,7,7a-mexahydro-N-methyl-4,7-methanoindan-1-amine
3a,4,5,6,7,7a-hexahydro-N-methyl-4,7-methanoindan-2-amine
3a,4,5,6,7,7a-hexahydro-N,N-dimethyl-4,7-methanoindan-5-amine
3a,4,5,6,7,7a-hexahydro-N,N-dimethyl-4,7-methanoindan-2-amine
3a,4,5,6,7,7a-hexahydro-N,N-dimethyl-4,7-methanoindan-1-amine The compounds falling within the scope of the invention can be prepared by a variety of methods.

3a,4,5,6,7,7a-hexahydro-4,7-methanoindan-5-amine can be prepared according to the procedure of Reimschneider, Z. fur Naturforschung 14B, 814 (1959) or Wilder et al., J. Am. Chem. Soc, 81 655 (1959).

3a,4,5,6,7,7a-hexahydro-4,7-methanoindan-8-amine can be prepared from the oxime of 8-keto-3a,4,5,6,7,7a-hexahydro-4,7-methanoendoindane described by Woodward in Tetrahedron, 5, 70 (1959).

Dimerization of methyl cyclopentadiene carboxylate gives a mixture of di-(methoxycarbonyl)-3a,4,7,7a-tetrahydro-4,7,methanoindenes. The isomer formed in largest proportion is shown by David Peters (J. Chem. Soc., 1959, 1757 to 1761) to be 2,5-di-(methoxycarbonyl)-3a, 4,7,7a-tetrahydro-4,7-methanoindene. The isomer formed in next largest amount is 2,4-di-(methoxycarbonyl)-3a,4, 7,7a-tetrahydro-4,7-methanoindene. This isomer is readily converted to 3a,4,7,7a - tetrahydro-4,7-methanoindene-4-carboxylic acid by saponification to the free acid, followed by heating the sodium salt alone or in the presence of copper salts to remove the acid group in the 2-position. The unsaturated 4-carboxylic acid is then reduced by catalytic hydrogenation to yield 3a,4,5,6,7,7a-hexahydro-4,7-methanoindane-4-carboxylic acid. This acid is converted to the amine by the Schmidt reaction or by Curtius reaction to give 3a,4,5,6,7,7a-hexahydro-4,7-methanoindan-4-amine.

Suitable methods for preparing 3a,4,5,6,7,7a-hexahydro-4,7-methanoindan-1-amine, 3a,4,5,6,7,7a-hexahydro-4,7-methanoindan-2-amine, and 3a,4,5,6,7,7a-hexahydro-47-methanoindan-3a-amine are illustrated in the examples hereinafter.

N - alkyl - 3a,4,5,6,7,7a - hexahydro - 4,7 - methanoindanamines within the scope of this invention can be obtained by the reduction of N-acyl compounds. When the N-alkyl group is methyl, the compound can be synthesized by refluxing the primary amine with excess butyl formate in the presence of a catalytic amount of sodium hydroxide to give the N-formyl derivative. The latter is dissolved in anhydrous tetrahydrofuran and refluxed with excess lithium aluminum hydride in ether. The reaction mixture is treated with water, followed by separation of the ether layer and extraction of the aqueous layer with ether. The combined ether layers are dried over potassium hydroxide. Removal of the solvent gives the 3a,4,5,6,7,7a-hexahydro-N-methyl-4,7-methanoindanamine. This can be converted to the hydrochloride by passing hydrogen chloride into an ether solution of the amine. Other N-alkylamines are obtained in a similar manner from other N-acyl derivatives which can be made by reaction of the primary amine with an acyl chloride in pyridine or with an acid anhydride. Thus the N-propionyl compound from the reaction of propionyl chloride and the amine in pyridine yields, following reduction by lithium aluminum hydride, the 3a,4,5,6,7,7a-hexahydro-N-propyl-4,7-methanoindanamine.

The corresponding N,N-dialkylamines where the two alkyl groups are identical are readily prepared by dealkylation of the quaternary salt made by reaction of the amine with an alkyl iodide. Heating with ethanolamine gives the N,N-dialkylamino derivative. The Eschweiler-Clarke reaction of the amine with formic acid and formaldehyde is an excellent method for preparing the N,N-dimethylamine.

By a combination of the above methods, unsymmetrically disubstituted compounds can be obtained. Formation of an N-acyl derivative of an N-methylhexahydromethanoindanamine followed by a lithium aluminum hydride reduction of the acyl group gives the N-alkyl-N-methyl-3a,4,5,6,7,7a-hexahydro-4,7-methanoindanamine.

Further compounds within the scope of the present invention are the hexahydromethanoindanmethylamine derivatives, i.e., where $n$ is 1. A suitable means of obtaining these compounds is described in German Patent 956,754.

Illustrative of compounds falling within the scope of the present invention are the following:

3a,4,5,6,7,7a-hexahydro-4,7-methanoindan-1-amine
3a,4,5,6,7,7a-hexahydro-4,7-methanoindan-2-amine
3a,4,5,6,7,7a-hexahydro-4,7-methanoindan-3a-amine
3a,4,5,6,7,7a-hexahydro-4,7-methanoindan-4-amine
3a,4,5,6,7,7a-hexahydro-4,7-methanoindan-5-amine
3a,4,5,6,7,7a-hexahydro-4,7-methanoindan-8-amine
3a,4,5,6,7,7a-hexahydro-N-ethyl-4,7-methanoindan-5-amine
3a,4,5,6,7,7a-hexahydro-N-ethyl-N-methyl-4,7-methanoindan-5-amine
3a,4,5,6,7,7a-hexahydro-N-propyl-4,7-methanoindan-5-amine
3a,4,5,6,7,7a-hexahydro-N-isopropyl-4,7-methanoindan-5-amine
3a,4,5,6,7,7a-hexahydro-N-butyl-4,7-methanoindan-5-amine
3a,4,5,6,7,7a-hexahydro-N-isobutyl-4,7-methanoindan-5-amine
3a,4,5,6,7,7a,-hexahydro-N-sec-butyl-4,7-methanoindan-5-amine
3a,4,5,6,7,7a-hexahydro-N-tert-butyl-4,7-methanoindan-5-amine
3a,4,5,6,7,7a-hexahydro-N-formyl-4,7-methanoindan-5-amine
3a,4,5,6,7,7a-hexahydro-N-allyl-4,7-methanoindan-5-amine
3a,4,5,6,7,7a-hexahydro-N-propargyl-4,7-methanoindan-5-amine
3a,4,5,6,7,7a-hexahydro-N-(2-butynyl)-4,7-methanoindan-5-amine
3a,4,5,6,7,7a-hexahydro-N-methyl-4,7-methanoindan-2-amine hydrochloride
3a,4,5,6,7,7a-hexahydro-N-methyl-4,7-methanoindan-3a-amine acetate
3a,4,5,6,7,7a-hexahydro-N-ethyl-4,7-methanoindan-8-sulfate
3a,4,5,6,7,7a-hexahydro-N,N-dimethyl-4,7-methanoindan-4-amine cyclohexylsulfamate
3a,4,5,6,7,7a-hexahydro-N-propyl-4,7-methanoindan-2-acetylsalicylate
3a,4,5,6,7,7a-hexahydro-N-ethyl-4,7-methanoindan-1-amine citrate
3a,4,5,6,7,7a-hexahydro-N-butyl-N-methyl-4,7-methanoindan-2-amine pamoate
3a,4,5,6,7,7a-hexahydro-4,7-methanoindan-2-methylamine
3a,4,5,6,7,7a-hexahydro-4,7-methanoindan-5-methylamine
3a,4,5,6,7,7a-hexahydro-N,N-dimethyl-4,7-methanoindan-5-methylamine
3a,4,5,6,7,7a-hexahydro-N-ethyl-4,7-methanoindan-5-methylamine
3a,4,5,6,7,7a-hexahydro-N-propyl-4,7-methanoindan-5-methylamine
3a,4,5,6,7,7a-hexahydro-4,7-methanoindan-5-methylamine hydrochloride
3a,4,5,6,7,7a-hexahydro-4,7-methanoindan-1-methylamine acetate
N-formyl-3a,4,5,6,7,7a-hexahydro-4,7-methanoindan-1-methylamine
3a,4,5,6,7,7a-hexahydro-N-propargyl-4,7-methanoindan-5-methylamine
3a,4,5,6,7,7a-hexahydro-N-allyl-N-propargyl-4,7-methanoindan-2-methylamine
3a,4,5,6,7,7a-hexahydro-N-allyl-N-methyl-4,7-methanoindan-1-methylamine hydrochloride
3a,4,5,6,7,7a-hexahydro-N-butyl-4,7-methanoindan-2-methylamine The compounds of this invention have broad antiviral effectiveness as illustrated by the activity of 3a,4,5,6,7,7a-hexahydro-4,7-methanoindan-5-amine in tissue culture tests and against such influenza viruses as influenza A (S-15) and influenza A-2 (Michigan A/AA) in mice. These compounds can be administered in the antiviral treatment according to this invention by any means that effects contact of the active ingredient compound with the site of virus infection in the body. It will be understood that this includes the site prior to infection setting in as well as after. Prophylactic as well as therapeutic treatment is contemplated.

For purposes of the invention, oral administration is preferred, although, if desired, administration can be parenterally, that is subcutaneously, intravenously, intramuscularly, or intraperitoneally. In the case of treating infections such as viral influenza and viral pneumonia, administration also can be by vapor or spray through the mouth or nasal passages.

The dosage administered will be dependent upon the disorder being treated, the age, health, and weight of the recipient, kind of concurrent treatment if any, frequency of treatment, and the nature of the effect desired. Generally, a daily dosage of active ingredient compound will be from about 1 to 200 milligrams per kilogram of body weight, although, lower, such as 0.5 milligram, or higher amounts can be used. Ordinarily, from 1 to 50 and preferably 1 to 20 milligrams per kilogram per day, in one or more applications per day, is effective to obtain the desired result.

The hexahydro-4,7-methanoindanamines or their salts can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use (except intravenous). In such compositions the active ingredient will ordinarily always be present in an amount of at least 0.0001% by weight based on the total weight of the composition and not more than 99% by weight.

Besides the active ingredient of the above formulas the composition will contain a solid or liquid nontoxic pharmaceutical carrier for the active ingredient.

In one embodiment of a pharmaceutical composition of this invention, the solid carrier is a capsule which can be of the ordinary gelatin type. In the capsule will be from about 10–90% by weight of a compound of Formula 1 or salt thereof and 90–10% of a carrier. In another embodiment, the active ingredient is tableted with adjuvants. In yet another embodiment, the active ingredient is put into powder packets. These dosage forms preferably contain from about 5 to about 500 milligrams of active ingredient, with from about 25 to about 250 most preferred.

A parenteral composition suitable for administration cated, be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectible solutions. Sterile injectible solutions such as saline will ordinarily contain from about 0.5% to 25%, and preferably about 5 to 20% by weight of the active ingredient.

As mentioned above, oral administration can be in a suitable suspension or syrup, in which the active ingredient ordinarily will constitute from about 0.5 to 10%, and preferably about 1 to 5%, by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well-known reference text in this field.

A parenteral composition suitable for administration by injection is prepared by stirring 5% by weight of a salt of a compound of Formula 1 in aqueous 0.9% saline and sterilizing the solution by standard procedures.

A better understanding will be gained by reference to the following examples illustrating the preparation of compounds coming within the invention and pharmaceutical compositions for their use in accordance with the invention. The parts or proportions stated in the examples are by weight unless otherwise indicated.

EXAMPLE 1

*3a,4,5,6,7,7a-hexahydro-4,7-methanoindan-1-amine hydrochloride*

29.2 parts of 3a,4,7,7a-tetrahydro-4,7-methanoindene-1-one prepared by the procedure of Alder and Flock, Ber. 87, 1916 (1954) is reduced in ethanol solution over platinum oxide catalyst. The solution is filtered to remove the catalyst and the solvent is evaporated under reduced pressure. The partly crystalline residue is filtered to give 21.5 parts of waxy solid, 3a,4,5,6,7,7a-hexahydro-4,7-methanoindane-1-one, and a liquid filtrate. The filtrate is dissolved in carbon tetrachloride and concentrated. On cooling, this concentrated solution deposits an additional 1.5 parts of solid ketone.

The combined solid products are converted to the oxime by treatment with 1 equivalent of hydroxylamine hydrochloride and 1 equivalent of dilute aqueous sodium hydroxide. The yield of oxime is 19.6 parts of crystals melting at 77.5–81° C. An analytical sample is crystallized from acetonitrile. This raises the melting point to 82–83° C.

Ten parts of the above oxime is dissolved in 50 parts of ethanol and charged to a stainless steel bomb with 10 parts of ammonia and 2 parts of Raney nickel catalyst. The reaction mixture is shaken and heated under 1500 lbs. of hydrogen at 143°. The reaction mixture is filtered and the solvent removed under reduced pressure. The residual greenish oil is dissolved in hexane and treated with dry hydrogen chloride gas. This precipitates a white, crystalline hydrochloride of 3a,4,5,6,7,7a - hexahydro - 4,7-methanoindan-1-amine amounting to 7.8 parts. After recrystallization from methanol/ethyl acetate, 6.2 parts of crystalline hydrochloride melting at 261–263° is obtained.

*Analysis.*—Calcd. for $C_{10}H_{18}NCl$: C, 64.50; H, 9.68; N, 7.48. Found: C, 64.44; H, 9.63; N, 7.57.

EXAMPLE 2

*3a,4,5,6,7,7a-hexahydro-4,7-methanoindan-2-amine hydrochloride*

Methyl 3a,4,7,7a-tetrahydro-4,7-methanoindene-2-carboxylate is prepared in 67% yield following the method of Alder, Ber., 87, 1752 (1954). The ester is dissolved in methanol and treated with hydrogen over platinum oxide catalyst at 30 to 45 lbs. pressure at room temperature. This yields a mixture of methyl 3a,4,5,6,7,7a-hexahydro - 4,7 - methanoindan - 2 - carboxylate and a small amount of still unsaturated ester. Reduction is completed in methanol solution at 50° and 1000 lbs. hydrogen pressure. The reaction mixture is filtered from the catalyst and distilled. This yields 8 parts of methyl 3a,4,5,6,7,7a-hexahydro-4,7-methanoindan-2-carboxylate boiling at 80–82°/0.3 mm. pressure. A nuclear magnetic resonance spectrum of the ester shows 3 methoxy protons at $\gamma 6.39$, 1 proton for $HCCOOH_3$ at $\gamma 7.89$, and the remaining 14 protons in a broad peak with 8 inflections and/or shoulders.

The ester is dissolved in methanolic sodium hydroxide and refluxed for 4 hours. The solvent is evaporated and the residue is dissolved in water, acidified to Congo red indicator with sulfuric acid and the organic acid is extracted into benzene. The dried acid solution is filtered, and the solvent is removed on a rotary evaporator. 13.1 parts of a heavy oil is obtained. This is 3a,4,5,6,7,7a-hexahydro-4,7-methanoindan-2-carboxylic acid.

*Analysis.*—Calcd. for $C_{11}H_{16}O_2$: N.E., 180.22. Found: N.E., 188.2.

The acid is reported by H. Hock and H. Kropf, J. Prakt. Chem. 14 ,71 (1961) as a liquid boiling at 93° at 0.03 mm.

The acid is dissolved in 182 parts of dried, water-washed chloroform, and charged to a flask fitted with a stirrer, condenser, and dropping funnel. Concentrated sulfuric acid (48 parts) is added and the mixture is warmed to 50°. The warm solution is stirred and treated with 7.1 parts of sodium azide, added in portions over a period of 2–3 hours. After the addition is completed, stirring and heating at 50° is continued for an additional 2 hours, after which the mixture is allowed to cool and stir at room temperature overnight. The reaction mixture is poured into 1000 parts of finely chopped ice. The chloroform layer is separated and discarded, and the acid layer is extracted once with petroleum ether. The acid layer is poured into a flask fitted with a stirrer and stirred under nitrogen while solid sodium hydroxide is added to pH 10. The flask is transferred to a continuous extractor where its contents are extracted with ether overnight. The ether extract is dried over solid sodium hydroxide for 24 hours, then filtered and distilled to obtain 6.7 parts of 3a,4,5,6,7,7a-hexahydro-4,7-methanoindan-2-amine boiling at 98–100° at 15 mm. pressure.

The amine is dissolved in ether and treated with dry hydrogen chloride. The precipitated hydrochloride salt is dissolved in isopropyl alcohol/ethyl acetate and allowed to crystallize. The yield is 4.6 parts of pure amine salt of melting point 294–296° in a sealed capillary.

*Analysis.*—Calcd. for $C_{10}H_{18}ClN$: C, 63.98; H, 9.67; Cl, 18.89; N, 7.46. Found: C, 63.77; H, 10.06; Cl, 18.71; N, 7.37.

EXAMPLE 3

*3a,4,5,6,7,7a-hexahydro-4,7-methanoindan-3a-amine hydrochloride*

3a,4,5,6,7,7a - hexahydro - 4,7 - methanoexoindan - 3a-carboxylic acid is prepared in 65% yield by the method of H. Koch and W. Haaf, Ann., 638, 111 (1960). A solution of 21 parts of the acid in 300 parts by volume of dried, water-washed chloroform and 80 parts by volume of 96% sulfuric acid is charged to a flask fitted with reflux condenser, stirrer, and addition funnel. The mixture is stirred and heated to 50° while 11.7 parts of sodium azide is added in small portions over a period of 2 hours. After the addition is completed, stirring and heating are contained for an additional 2 hours, after which the mixture is stirred overnight at room temperature. The reaction mixture is then poured onto 600 parts of crushed ice and the amine is isolated as in Example 2. The yield is 11.2 parts of 3a,4,5,6,7,7a-hexahydro-4,7-methanoexoindan-3a-amine, boiling at 79–80° at 7.5 mm. A nuclear magnetic resonance spectrum shows the amino protons at $\gamma 8.21$ shifted to $\gamma 6.83$ on protonation with trifluoroacetic acid and shows no proton that would correspond to $HCNH_2$. This confirms that no rearrangement of the amine group to another position than 3a occurred. The amine is converted to the hydrochloride as in Example 2 and is recrystallized from a mixture of isopropyl alcohol/benzene/ hexane in a 1:2:2 ratio. This yields 4.7 parts of amine hydrochloride melting above 330° in a sealed capillary at which temperature the substance blackened.

*Analysis.*—Calcd. for $C_{10}H_{18}ClN$: C, 63.98; H, 9.67; Cl, 18.89; N, 7.46. Found: C, 64.00; H, 9.84; Cl, 18.88; N, 7.53.

EXAMPLE 4

*3a,4,5,6,7,7a-hexahydro-N-formyl-4,7-methanoindan-5-amine*

Butyl formate (25 ml.) containing 0.05 mole of 3a,4,5,6,7,7a-hexahydro-4,7-methanoindan-5-amine is refluxed for 20 hours. The product is isolated as a residue by the evaporation of the excess butyl formate at reduced pressure.

Substitution of other amines of this invention for the above amine yields their N-formyl derivatives.

EXAMPLE 5

*3a,4,5,6,7,7a-hexahydro-N-methyl-4,7-methanoindan-5-amine*

An 0.05-mole amount of N-formyl-3a,4,5,6,7,7a-hexahydro-4,7-methanoindan-5-amine is dissolved in 200 ml. of dry tetrahydrofuran and added to a suspension of 3.0 g. of lithium aluminum hydride in 350 ml. of dry ether. After complete addition the mixture is refluxed 2 hours and then cooled to room temperature. Water is added to the mixture cautiously until hydrogen evolution ceases and the solids become white. This requires about 10 ml. The mixture is stirred 1 hour, filtered, and the solids are washed well with 50 ml. of ether. The ether washes are combined, dried over potassium carbonate, filtered and evaporated at reduced pressure. The amine residue is purified by vacuum distillation.

EXAMPLE 6

*3a,4,5,6,7,7a-hexahydro-N-ethyl-4,7-methanoindan-1-amine*

The 0.05 mole amount of N-formyl-3a,4,5,6,7,7a-hexahydro-4,7-methanoindan-5-amine used in Example 2 is replaced by the N-acetyl-1-amine and the procedure is repeated to yield the subject compound.

EXAMPLE 7

*3a,4,5,6,7,7a-hexahydro-N,N-dimethyl-4,7-methanoindan-2-amine hydrochloride*

A 50 ml. round-bottom flask is charged with 0.15 mole (6.90 g.) of 98% formic acid and 0.15 mole (12.1 g.) of 37% formalin solution. Then, 0.05 mole of 3a,4,5,6,7,7a-hexahydro-4,7-methanoindan-2-amine is charged, a condenser is attached, and the mixture is heated at 95° with a steam bath for 16 hours. Gas is evolved during the heat-up period and for some time thereafter. After cooling, the mixture is transferred to a separatory funnel with 50 ml. of water, 25 ml. of 50% sodium hydroxide is added, and the mixture is extracted with three 25 ml. portions of ether. The ether extracts are combined, washed with 50 ml. of 12% sodium hydroxide, dried with potassium hydroxide pellets, and hydrogen chloride gas is passed in until precipitation is complete. The precipitate is filtered and dried to yield the subject compound.

EXAMPLE 8

*3a,4,5,6,7,7a-hexahydro-N-butyl-4,7-methanoindan-5-amine*

N - butyryl - 3a,4,5,6,7,7a - hexahydro - 4,7 - methanoindan-5-amine is prepared by dissolving 0.10 mole of 3a,4,5,6,7,7a-hexahydro-4,7-methanoindan-5-amine in 75 ml. of pyridine and adding 0.15 mole of butyryl chloride dropwise over a 15 minute period with cooling so that the temperature does not rise over 60° C. The mixture is heated at 60° C. for 2 hours, and then cooled and poured into 1000 ml. of ice water. The precipitated N-butyryl amide is filtered and dried.

The 0.05 mole amount of N-formyl amine used in Example 5 is replaced with 0.05 mole of the above N-butyryl amide, and Example 5 is repeated to yield the subject compound.

EXAMPLE 9

*3a,4,5,6,7,7a - hexahydro - N - allyl - 4,7 - methanoindan-5 - amine hydrochloride—3a,4,5,6,7,7a - hexahydro-N,N - diallyl - 4,7 - methanoindan - 5 - amine hydrochloride*

A 2-liter round-bottom flask is equipped with thermometer, dropping funnel, reflux condenser, paddle stirrer and a connection to a gas meter, and charged with 500 ml. of absolute ethanol, 50.4 g. (0.60 mole) of sodium bicarbonate and 0.20 mole of 3a,4,5,6,7,7a-hexahydro-4,7-methanoindan-5-amine hydrochloride. Then, 24.2 g. (0.20 mole) of allyl bromide is added from the dropping funnel. There is no appreciable evolution of carbon dioxide. The mixture is gradually warmed to 65° C. when gas evolution begins. The reaction is allowed to continue until no more gas is evolved. The mixture is cooled, the solids are filtered, and the filtrate is evaporated. The residue is distributed between ether and 10% sodium hydroxide solution. The ether layer is dried with anhydrous potassium carbonate and evaporated. The residue is distilled at reduced pressure to give two main fractions. The lower-boiling fraction is the desired N-allyl derivative and the higher is the desired N,N-diallyl product. These are dissolved in ether, and gassed with dry hydrogen chloride until precipitation is complete. The precipitates are filtered and dried to yield the desired hydrochlorides.

EXAMPLE 10

*3a,4,5,6,7,7a - hexahydro - N - propargyl - 4,7 - methanoindan - 5 - amine—3a,4,5,6,7,7a - hexahydro - N,N-dipropargyl-4,7-methanoindan-5-amine*

A reaction is run as described in Example 9, substituting 16.4 g. (0.20 mole) of propargyl chloride for the 24.2 g. of allyl bromide. The lower-boiling fraction is the N-propargyl derivative, and the higher-boiling fraction is the N,N-dipropargyl derivative.

EXAMPLE 11

*3a,4,5,6,7,7a-hexahydro-4,7-methanoindan-5-methylamine hydrochloride*

A mixture of 0.015 mole of 3a,4,5,6,7,7a-hexahydro-4,7-methanoindan-5-carboxylic acid and 10 ml. (16.55 g., 0.139 mole) of thionyl chloride is refluxed two hours, the cooled to room temperature. The excess thionyl chloride is removed at reduced pressure, and the acid chloride residue is dissolved in 100 ml. of dry chloroform. This is cooled to −10° C., and ammonia gas is bubbled in for 10 minutes. Then the mixture is allowed to warm to room temperature and stir overnight. The solvent is evaporated in a vacuum, and the residue is dissolved in 100 ml. of benzene. The insoluble ammonium chloride is filtered, and the filtrate is concentrated to dryness to yield 3a,4,5,6,7,7a-hexahydro-4,7-methanoindan-5-carboxamide.

A 200 ml. round-bottom flask is fitted with a Soxhlet extractor and charged with 1.56 g. of lithium aluminum hydride and 200 ml. of tetrahydrofuran. The extractor cup is charged with 0.015 mole of the above amide, and the apparatus is operated overnight, stirring the flask contents with a magnetic stirrer. The reaction is cooled to room temperature and the excess lithium aluminum hydride is destroyed by cautiously adding about 5 ml. of water until the solids are white and coagulated. The mixture is filtered, the solids are washed well with ether, and the filtrate and washings are combined, dried with solid potassium hydroxide and then dried with anhydrous magnesium sulfate. Dry hydrogen chloride gas is bubbled into the ether solution until precipitation is complete. The precipitate is filtered and dried to yield the subject amine hydrochloride.

EXAMPLE 12

*3a,4,5,6,7,7a-hexahydro-N-methyl-4,7-methanoindan-5-methylamine hydrochloride*

The use of anhydrous methylamine gas in place of ammonia gas in the procedure of Example 11 yields the N-methyl carboxamide, which is reduced with lithium aluminum hydride by the procedure of the example to yield the subject amine hydrochloride.

EXAMPLE 13

*3a,4,5,6,7,7a-hexahydro-N-butyl-N-methyl-4,7-methanoindan-5-methylamine hydrochloride*

The procedure of Example 11 is repeated, substituting 5 ml. of N-butyl-N-methyl amine for the ammonia gas, dropping the liquid amine into the solution of the acid chloride in chloroform at 10° C. After warming to room temperature and stirring overnight, the chloroform is evaporated at reduced pressure. The residue is stirred in 75 ml. of water, then filtered and dried to yield N-butyl - N - methyl - 3a,4,5,6,7,7a-hexahydro-4,7-methanoindan-5-carboxamide. This compound is reduced by the procedure of Example 11 to yield the N-butyl-N-methyl amine.

EXAMPLE 14

*3a,4,5,6,7,7a-hexahydro-4,7-methanoindan-5-methylamine acetate*

A mixture of 0.10 mole of the above-named amine (free base) and 0.10 mole of glacial acetic acid in 100 ml. of water is concentrated in a vacuum at 60° C. The residue is dried well, and is the desired amine acetate.

EXAMPLE 15

*3a,4,5,6,7,7a-hexahydro-N-ethyl-4,7-methanoindan-1-methylamine lactate*

A mixture of 0.10 mole of the above-named amine and 0.10 mole of 85% lactic acid in 75 ml. of absolute ethanol is concentrated in a vacuum at 45° C., and then dried well. The compound is the desired amine lactate.

EXAMPLE 16

*3a,4,5,6,7,7a-hexahydro-N-methyl-4,7-methanoindan-5-amine cyclohexylsulfamate*

A mixture of 0.10 mole of the above-named amine and 0.10 mole of cyclohexylsulfamic acid in 100 ml. of water is concentrated in a vacuum at 60° C. The residue is dried well, and is the desired compound.

EXAMPLE 17

*3a,4,5,6,7,7a-hexahydro-4,7-methanoindan-2-amine acetylsalicylate*

A mixture of 0.10 mole of the appropriate amine and 0.10 mole of acetylsalicylic acid in 75 ml. of absolute ethanol is concentrated in a vacuum at 45° C., and then dried well. The compound is the desired amine acetylsalicylate.

EXAMPLE 18

*3a,4,5,6,7,7a-hexahydro-4,7-methanoindan-5-amine bicarbonate*

Carbon dioxide gas is passed into a solution of 0.10 mole of the appropriate amine in 100 ml. of ether until precipitation is complete. The precipitate of bicarbonate salt is filtered and dried.

EXAMPLE 19

*3a,4,5,6,7,7a-hexahydro-N-methyl-4,7-methanoindan-1-amine pamoate*

A solution of 0.20 mole of the appropriate amine hydrochloride in 100 ml. of water is added to a solution of 0.10 mole of pamoic acid disodium salt in 500 ml. of water. (Pamoic acid is 4,4'-methylene-bis-(3-hydroxy-2-naphthoic acid.) The resulting precipitate is filtered, washed well with water, and dried to yield the desired amine pamoate.

EXAMPLE 20

Oval shaped tablets for oral administration, each containing 100 mgs. of 3a,4,5,6,7,7a-hexahydro-4,7-methanoindan-5-amine hydrochloride are prepared from the following formulation:

| | Grams |
|---|---|
| 3a,4,5,6,7,7a - hexahydro - 4,7 - methanoindan - 5-amine hydrochloride | 5000 |
| Mannitol, N.F. | 2500 |
| Starch, U.S.P. | 375 |
| Magnesium stearate, U.S.P. | 225 |
| Dry pyrogenic silica $SiO_2$ with particle size of 0.015 microns, surface area of 200 $m.^2/gm.$, and bulk density of 2.2 lbs./cu. ft. ("Cab-O-Sil," Cabot Corp.) | 15 |

A mixture of the active ingredient, mannitol, and "Cab-O-Sil" is screened through a 40 mesh screen and granulated with a 10% w./v. aqueous solution of gelatin, U.S.P. To the dried granules is added the mixture of starch and magnesium stearate and the final mixture is compressed into tablets of the proper weight.

EXAMPLE 21

Two piece, hard, gelatin capsules for oral administration, each containing 50 mgs. of 3a,4,5,6,7,7a-hexahydro-N-methyl-4,7-methanoindan-5-amine hydrochloride are prepared from the following formulation:

| | Grams |
|---|---|
| 3a,4,5,6,7,7a - hexahydro - N-methyl-4,7-methanoindan-5-amine hydrochloride | 2000 |
| Lactose, U.S.P. | 7950 |
| Dry pyrogenic silica $SiO_2$ with particle size of 0.015 microns, surface area of 200 $m.^2/gm.$, and bulk density of 2.2 lbs./cu. ft. ("Cab-O-Sil," Cabot Corp.) | 50 |

The above ingredients are mixed, screened through a 40 mesh screen and encapsulated in the usual manner using a number 3 capsule.

EXAMPLE 22

One-piece soft gelatin capsules for oral administration, each containing 150 mgs. of 3a,4,5,6,7,7a-hexahydro-N,N-dimethyl-4,7-methanoindan-5-amine prepared by first dispersing the powdered active ingredient in corn oil in a concentration of 50% w./v. and encapsulating in the usual manner.

EXAMPLE 23

A sterile aqueous solution suitable for intramuscular or intravenous administration and containing 25 mgs. of 3a,4,5,6,7,7a - hexahydro - 4,7-methanoindan-2-amine hydrochloride in each milliliter is prepared from the following ingredients:

| | Grams |
|---|---|
| 3a,4,5,6,7,7a - hexahydro - 4,7-methanoindan-2-amine hydrochloride | 25 |
| Sodium metabisulfite | 1 |
| Physiological saline, qs. to 1000 ml. | |

The solution is sterilized by filtration.

The compositions of the present invention, as will be readily understood, can be used in conjunction with other well-known medicaments including analgesics such as, for example, codeine and salicylamide; hypnotics such as barbituates and chloral hydrate; antihistaminics such as chlorpheniramine maleate, promethazine hydrochloride, pyrilamine maleate, and the like; decongestants such as phenylephrine hydrochloride and phenylpropanolamine hydrochloride, and the like; antitussives such as benzonatate, dextromethorphan hydrobromide, and the like.

EXAMPLE 24

The following composition is prepared:

| | Parts |
|---|---|
| Acetylsalicylic acid, U.S.P. | 60 |
| Acetaminophen, NF | 30 |
| 3a,4,5,6,7,7a - hexahydro - N - methyl-4,7-methano-indan-5-amine hydrochloride | 10 |

The above ingredients are stirred together in a Hobart mixer until the mixture is homogeneous, after which they are compressed into quarter-scored round tablets in a conventional tableting machine. The dosage units are administered as required.

EXAMPLE 25

Tablets for oral administration are prepared as follows:

| | Parts |
|---|---|
| Acetylsalicylic acid, U.S.P. | 3000 |
| Acetaminophen, NF | 1500 |
| 3a,4,5,6,7,7a - hexahydro - 4,7 - methanoindan - 5-amine hydrochloride | 500 |
| Starch, U.S.P. | 500 |
| Magnesium stearate, U.S.P. | 55 |
| Talc, U.S.P. | 55 |

10% gelatin solution—quantity sufficient.

The acetylsalicylic acid, acetaminophen, 3a,4,5,6,7,7a-hexahydro-4,7-methanoindan-5-amine hydrochloride and starch are screened through a 45 mesh screen, intimately mixed and granulated with sufficient gelatin solution to produce a homogeneous tablet mass. After drying and grinding to 12 to 15 mesh, the granules are lubricated with the magnesium stearate-talc mixture and pressed into tablets using conventional equipment. The tablet weights are adjusted to give the desired dosage.

EXAMPLE 26

The following ingredients are combined as follows:

| | Parts |
|---|---|
| Acetylsalicylic acid, U.S.P. | 3000 |
| Acetaminophen, NF | 1500 |
| 3a,4,5,6,7,7a-hexahydro-4,7-methanoindan-1-amine hydrochloride | 500 |
| Dry pyrogenic silica $SiO_2$ with particle size of 0.015 microns, surface area of 200 m.$^2$/gm., and bulk density of 2.2 lbs./cu. ft. ("Cab-O-Sil," Cabot Corp.) | 15 |

The above ingredients are screened through a 40 mesh screen and mixed in a Patterson-Kelly blender. Dosage units are prepared according to the present invention by filling two-piece, hard, gelatin capsules with 500 milligrams of the mixture.

EXAMPLE 27

One piece soft gelatin capsules for oral administration are prepared by dispersing the mixture as set forth in Example 26 in soybean oil in a concentration of 50% of said composition per volume of the space in each capsule, and encapsulating in the appropriate equipment.

In accordance with another aspect of this invention, compounds of the invention are useful in the control of influenza in animals. This may be conveniently accomplished by incorporating the compound in the diet of the animal. Generally, an amount of active compound will be used to provide from about 0.0001% to 0.1% by weight of the active compound based on the total weight of feed intake. Preferably, from 0.001% to 0.02% by weight will be used. Descriptions of suitable feeds can be found in the book "Feeds and Feeding" by Frank B. Morrison, published by the Morrison Publishing Company of Ithaca, New York, 1948, 21st edition. The selection of the particular feed is within the knowledge of the art and will depend of course on the animal, the economics, natural materials available, the surrounding circumstances, and the nature of the effect desired, as will be readily understood.

A particularly important composition according to this feature of the invention is a concentrate, suitable for preparation and sale to a farmer or livestock grower for addition to the animal's feedstuffs in appropriate proportion. These concentrates ordinarily comprise about 0.5% to about 95% by weight of the active ingredient compound together with a finely divided solid, preferably a flour such as wheat, corn, soya bean and cottonseed flour. Depending on the recipient animal, the solid adjuvant can be ground charcoal, fuller's earth, oyster shell and the like. Finely divided attapulgite and bentonite can be used, these latter materials also acting as solid dispersing agents.

The feed compositions, as well as the just described concentrates, can additionally contain other components of feed concentrates or animal feeds, as will be readily understood. Other important additives include proteins, carbohydrates, fats, vitamins, minerals, antibiotics, etc.

The following example will further illustrate this aspect of this invention:

EXAMPLE 28

A feed for pigs is prepared as follows:

| | Pounds |
|---|---|
| Oat groats | 350 |
| Yellow corn, ground | 1000 |
| Molasses | 100 |
| Soybean meal | 450 |
| Dried skim milk | 100 |
| Ground limestone | 20 |
| Dicalcium phosphate | 20 |
| Salt plus trace mineral mix | 10 |
| Standard vitamin premix | 1 |
| | 2051 |

According to this invention there is added to pigs' diet a concentrate of 50% of the active compound of Example 1 and 50% by weight corn flour, in an amount that provides 0.015% by weight of said active ingredient based on the total diet.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

I claim:

1. A method of controlling virus infection in a warm-blooded animal comprising administering to said warm-blooded animal from 1 to 200 milligrams per kilogram per day of body weight of a compound selected from the group consisting of (a) compounds of the formula

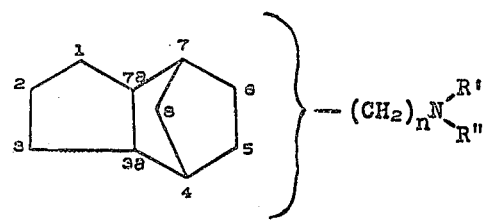

where

R' is selected from the group consisting of hydrogen; alkyl of 1 through 4 carbon atoms; alkenyl of 3 through 4 carbon atoms, having unsaturated bonding in other than the 1-position of said alkenyl; and alkynyl of 3 through 4 carbon atoms, having unsaturated bonding in other than the 1-position of said alkynyl group;

R' is selected from the group consisting of hyformyl; and n is an integer from 0 to 1; and (b) non-toxic salts of the compounds of (a).

2. The method as set forth in claim 1 wherein the compound is 3a,4,5,6,7,7a-hexahydro-4,7-methanoindan-5-amine hydrochloride.

3. The method as set forth in claim 1 wherein the compound is 3a,4,5,6,7,7a-hexahydro-4,7-methanoindan-1-amine hydrochloride.

4. The method as set forth in claim 1 wherein the compound is 3a,4,5,6,7,7a-hexahydro-4,7-methanoindan-2-amine hydrochloride.

5. The method as set forth in claim 1 wherein the compound is 3a,4,5,6,7,7a-hexahydro-N-methyl-4,7-methanoindan-5-amine hydrochloride.

6. The method as set forth in claim 1 wherein the compound as 3a,4,5,6,7,7a-hexahydro-N-methyl-4,7-methanoindan-1-amine hydrochloride.

7. The method as set forth in claim 1 wherein the compound is 3a,4,5,6,7,7a-hexahydro-N-methyl-4,7-methanoindan-2-amine hydrochloride.

8. The method as set forth in claim 1 wherein the compound is 3a,4,5,6,7,7a-hexahydro-N,N-dimethyl-4,7-methanoindan-5-amine hydrochloride.

9. The method as set forth in claim 1 wherein the compound is 3a,4,5,6,7,7a-hexahydro-N,N-dimethyl-4,7-methanoindan-1-amine hydrochloride.

10. The method as set forth in claim 1 wherein the compound is 3a,4,5,6,7,7a-hexahydro-N,N-dimethyl-4,7-methanoindan-2-amine hydrochloride.

References Cited by the Applicant

UNITED STATES PATENTS 2,969,391   1/1961   Aeschlimann et al.

FOREIGN PATENTS 1,041,495   2/1957   Germany.

OTHER REFERENCES

H. Koch and W. Haaf, Ann. 638, 1960, 111.
Riemschneider, Zeit. f. Naturforsch, 14B, 1959, 814.
Wilder et al., J. Am. Chem. Soc. 81, 1959, 655.

SAM ROSEN, *Primary Examiner.*

JULIAN S. LEVITT, *Examiner.*

N. G. MANN, *Assistant Examiner.*

UNITED STATES PATENT OFFICE
CERTIFICATE OF CORRECTION

Patent No. 3,290,215                         December 6, 1966

George Levitt

It is hereby certified that error appears in the above numbered patent requiring correction and that the said Letters Patent should read as corrected below.

Column 13, line 1, for "$R'$" read -- $R''$ --; same line 1, for "hy-" read -- $R'$ --; line 18, for "as" read -- is --.

Signed and sealed this 19th day of September 1967.

(SEAL)
Attest:

ERNEST W. SWIDER                          EDWARD J. BRENNER
Attesting Officer                               Commissioner of Patents